United States Patent Office 3,184,459
Patented May 18, 1965

3,184,459
3-(p-TRIAZINYLAMINO-PHENYL)-COUMARIN COMPOUNDS
Edgar Siegel, Leverkusen, and Heinrich Gold, Cologne-Stammheim, Germany, assignors to Farbenfabriken Bayer Aktiengesellschaft, Leverkusen, Germany, a German corporation
No Drawing. Filed July 10, 1962, Ser. No. 208,953
Claims priority, application Germany, Sept. 11, 1961, F 34,900
4 Claims. (Cl. 260—249.5)

The present invention relates to coumarin compounds; more particularly it concerns 3-(p-triazinylamino-phenyl)-coumarin compounds of the general formula

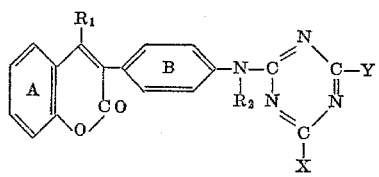

wherein $R_1$ and $R_2$ stand independently for hydrogen or a lower alkyl radical, e.g. for the methyl or ethyl radical, while X and Y represent independently halogen, optionally substituted alkoxy or aryloxy groups, alkyl mercapto or aryl mercapto groups, the amino group or radicals of optionally substituted primary or secondary amines, the benzene nuclei A and B being possibly further substituted, e.g. by halogen or by alkyl, cyano, alkylsulfone, sulfonamide, carboxyl or sulfonic acids.

Representatives of the coumarin compounds of the present invention are shown in the following table; in this table Z indicates the atom or atomic grouping in the 7-position of the coumarin system.

TABLE

| X | Y | Z |
|---|---|---|
| Cl | —NH$_2$ | H |
| Cl | —NH—CH$_3$ | H |
| Cl | —NH—C$_2$H$_5$ | H |
| Cl | —NH—C$_3$H$_7$(n) | H |
| Cl | —NH—C$_4$H$_9$(n) | H |
| Cl | —NH—CH$_2$—CH—(CH$_3$)$_2$ | H |
| Cl | —NH—C$_{12}$H$_{25}$ | H |
| Cl | —N(CH$_3$)$_2$ | H |
| Cl | —N(C$_2$H$_5$)$_2$ | H |
| Cl | —N(C$_2$H$_5$)(C$_6$H$_{11}$) | H |
| Cl | —N(C$_6$H$_{11}$)$_2$ | H |
| Cl | —NH—C$_6$H$_{11}$ | H |

Table—Continued

| X | Y | Z |
|---|---|---|
| Cl | —NH—C$_6$H$_5$ | H |
| Cl | —N(CH$_3$)(C$_6$H$_5$) | H |
| Cl | —N(C$_6$H$_5$)SO$_2$— | H |
| Cl | —N(C$_2$H$_5$)$_2$ | —CH$_3$ |
| Cl | —N(CH$_3$)(C$_6$H$_5$) | Cl |
| —OCH$_3$ | —OCH$_3$ | H |
| —OCH$_3$ | —N(C$_2$H$_5$)$_2$ | H |
| —OCH$_3$ | —NH—C$_6$H$_5$ | H |
| —OCH$_3$ | —N(CH$_3$)(C$_6$H$_5$) | H |
| —OCH$_3$ | —N(C$_2$H$_5$)$_2$ | —CH$_3$ |
| —NH$_2$ | —NH$_2$ | H |
| —N(C$_2$H$_5$)$_2$ | —N(C$_2$H$_5$)$_2$ | H |
| —NH—C$_6$H$_5$ | —NH—C$_6$H$_5$ | H |
| —N(CH$_3$)(C$_6$H$_5$) | —N(CH$_3$)(C$_6$H$_5$) | H |

The production of the coumarin compounds of the present invention from the starting components can be carried out in known manner, e.g. by reaction of optionally substituted 3-(p-aminophenyl)-coumarins with halogen triazines, if desired with further exchange of remaining halogen atoms by appropriate substituents.

The coumarin compounds of the present invention can be used as optical brightening agents; for this purpose they can be applied in the usual way, for example in the form of solutions in water or in organic solvents or in the form of aqueous dispersions; they can also be applied together with detergents. Furthermore they can be incorporated as brightening agents in spinning or casting compositions for the production of artificial fibres, threads, foils or other shapes.

The parts in the following examples given by way of illustration of the present invention are parts by weight.

Example 1

To a solution of 8 parts of cyanuric chloride in 40 parts of acetone, a solution of 10.6 parts of 3-(p-aminophenyl)-coumarin in 235 parts of acetone is added at 0–5° C. The mixture is then treated with 50 parts of ice and by gradual addition of a 16% soda solution brought to a pH value of 6. The reaction mixture is thereupon treated with 11.05 parts of N-ethyl-cyclohexylamine, stirred for 10 to 15 hours at room temperature and then heated for 30 minutes to 50° C. The acetone is then distilled off, the residue diluted with water and the precipitated pale yellow product filtered off, washed with water and dried. After recrystallizing from a mixture of benzene and light benzine the resulting coumarin compound which corresponds to the formula

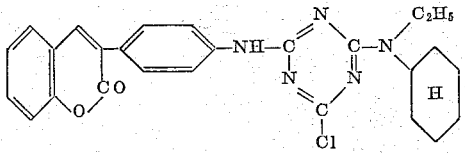

melts at 219° C.

*Example 2*

The same procedure is followed as described in Example 1 with the difference that instead of 11.05 parts of N-ethyl-cycloethylamine there are applied 6.4 parts of diethylamine. The melting point of the coumarin compound of the formula

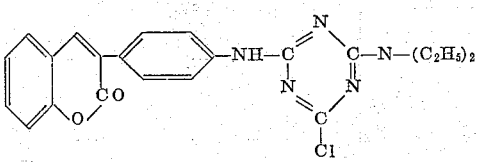

thus obtained and recrystallised from glycol monomethyl ether acetate, lies at 218° C.

*Example 3*

A solution of 7.9 parts of 2,4-dimethoxy-6-chlorotriazine in 40 parts of acetone is mixed with a solution of 10.6 parts of 3-(p-aminophenyl)-coumarin in 235 parts of acetone, the mixture treated with 50 parts of water and heated while stirring for 12 hours at 60° C.; the hydrochloric acid thus formed is continuously neutralised with added soda. The acetone is then distilled off, the residue diluted with water, the reaction product which crystallized out filtered off and washed first with water, and then with methanol. After recrystallising from glycol monomethyl ether acetate the coumarin compound which corresponds to the formula

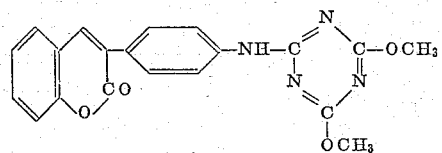

melts at 221° C.

*Example 4*

In 1000 parts of a sheet of polyvinyl chloride, which besides a commercial plasticizer also contains about 10 parts of titanium dioxide as white pigment, there is incorporated on the hot roll 1 part of the coumarin compound of Example 1 as brightening agent. The sheet then obtained shows a beautiful and outstandingly light-fast white shade.

*Example 5*

In a washing bath containing per litre 5 g. of a commercial mild or coarse detergent and 0.05 g. of the coumarin compound of Example 2 as brightening agent, a fabric of polyester fibres is treated for 30 minutes at 95–100° C. using a goods-to-liquor ratio of 1:20. After rinsing and drying the fabric shows a brightening which is very fast to light.

*Example 6*

A solution of 5 parts of the coumarin compound of Example 3 in 100 parts of dimethyl formamide is poured into a cold solution prepared by dissolving 100 parts of a mixture consisting of a fatty alcohol sulfonate and a fatty alcohol polyglycol ether in 100,000 parts of water.

The aqueous dispersion of the coumarin compound thus obtained which serves as brightening agent, is brought to a pH value of 4 by addition of acetic acid, and fibres or fabrics of polyamide are placed in cold, using a goods-to-liquor ratio of 1:40. The bath is then brought to the boil within 15 minutes and held at boiling temperature for 30 minutes. After rinsing and drying the polyamide fibre material is brightened very well; the brightening is very fast to light.

We claim:

1. A compound of the formula

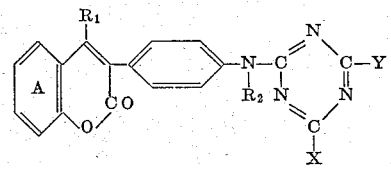

wherein $R_1$ and $R_2$ are members selected from the group consisting of hydrogen and lower alkyl; X is a member selected from the group consisting of chloro, lower alkoxy, amino, lower dialkylamino, $$-N\underset{H}{\bigcirc}, \text{ and } -N\underset{CH_3}{\overset{H}{\bigcirc}}{CH_3}$$

Y is a member selected from the group consisting of amino, alkyl-amino, di-lower-alkyl-amino, lower alkyl-cyclohexyl amino, dicyclohexyl amino, lower alkoxy, $$-N\bigcirc, -N\underset{H}{\bigcirc}, -N\underset{}{\bigcirc}SO_2 \text{ and } -N\underset{Alk}{\overset{H}{\bigcirc}}{Alk}$$

wherein Alk is defined as lower alkyl; and the benzene nuclei, A, corresponding to the 7-position of the coumarin system, has a substituent grouping selected from the group consisting of hydrogen, methyl and chloro.

2. The coumarin compound of the formula

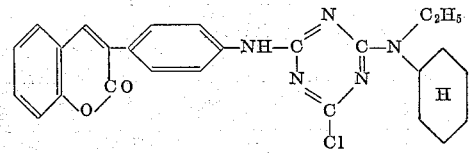

3. The coumarin compound of the formula

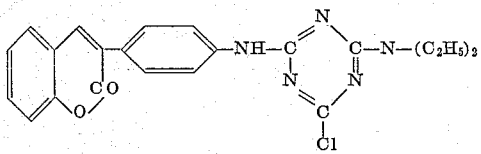

4. The coumarin compound of the formula

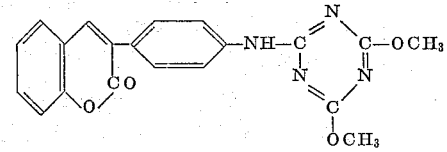

References Cited by the Examiner

UNITED STATES PATENTS 2,945,033  7/60  Hausermann _____ 260—249.8

FOREIGN PATENTS 518,213  11/55  Canada.
835,719  5/60  Great Britain.

IRVING MARCUS, *Primary Examiner.*

WALTER A. MODANCE, *Examiner.*